(12) United States Patent
Lee et al.

(10) Patent No.: US 8,600,631 B2
(45) Date of Patent: Dec. 3, 2013

(54) ENGINE SPEED ASSIST TORQUE CONVERTER CLUTCH CONTROL

(75) Inventors: Chunhao J. Lee, Troy, MI (US); Kumaraswamy V. Hebbale, Troy, MI (US); Xu Chen, Ann Arbor, MI (US); Paul G Otanez, Troy, MI (US); Xuefeng Tim Tao, Northville, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 13/112,094

(22) Filed: May 20, 2011

(65) Prior Publication Data
US 2012/0296536 A1  Nov. 22, 2012

(51) Int. Cl.
*G06F 7/00* (2006.01)
*B60W 10/02* (2006.01)

(52) U.S. Cl.
USPC ............................................. 701/54; 477/176

(58) Field of Classification Search
USPC ..................... 701/54; 477/176, 180
See application file for complete search history.

(56) References Cited

U.S. PATENT DOCUMENTS

| | | | |
|---|---|---|---|
| 5,484,354 | A | 1/1996 | Vukovich et al. |
| 5,531,302 | A | 7/1996 | Koenig et al. |
| 2007/0287594 | A1 | 12/2007 | DeGeorge et al. |
| 2008/0076635 | A1 | 3/2008 | Lee et al. |

OTHER PUBLICATIONS

U.S. Appl. No. 13/041,527, filed Jun. 30, 2011, Lee et al.
U.S. Appl. No. 12/651,525, not publ'd, Otanez at al.

*Primary Examiner* — Khoi Tran
*Assistant Examiner* — Robert Nguyen

(57) ABSTRACT

A method for controlling actuation of a torque converter clutch includes monitoring a transmission input speed, comparing the monitored transmission input speed to a threshold input speed, and, when the transmission input speed is less than the threshold input speed, controlling an engine speed based upon a desired minimum engine speed. Controlling the engine speed based upon the desired minimum engine speed includes monitoring a minimum engine speed critical parameter, determining the desired minimum engine speed based upon the minimum engine speed critical parameter, comparing the engine speed to the desired minimum engine speed, and controlling actuation of the clutch device based upon a result of the comparing the engine speed to the desired minimum engine speed.

14 Claims, 2 Drawing Sheets

ENGINE SPEED ASSIST TORQUE CONVERTER CLUTCH CONTROL

TECHNICAL FIELD

This disclosure is related to torque transmission devices.

BACKGROUND

The statements in this section merely provide background information related to the present disclosure. Accordingly, such statements are not intended to constitute an admission of prior art.

A torque converter can be placed between an internal combustion engine and an automatic transmission device and can transmit torque therebetween, using an impeller and a turbine device in a fluidic medium. A torque converter clutch can include a pressurized fluid-actuated friction device engageable to mechanically couple the impeller, receiving input from the engine, and the turbine, having an output to the transmission. In a typical application, the clutch can be fully released, actuated in a slip mode, or fully engaged, i.e. locked. When the clutch is fully released, there is unrestrained slippage between the impeller and the turbine, and torque is transmitted therebetween based upon the flow of hydraulic fluid between the impeller and the turbine. When the clutch is actuated in the slip mode, torque is transmitted between the impeller and the turbine through the flow of hydraulic fluid therebetween and controlling pressure of hydraulic fluid to the actuated clutch, and typically there is a difference in rotational speeds between the impeller and the turbine, i.e., a relative speed. When the clutch is fully released or actuated in the slip mode, torque perturbations between the engine and the transmission resulting from either engine operation or driveline dynamics are absorbed in the fluid of the torque converter.

When the clutch is fully engaged, the rotational speeds of the impeller and the turbine are the same, and torque is transmitted between the impeller and the turbine through the actuated torque converter clutch. When the torque converter clutch is fully engaged, a range of engine torque perturbations or torsionals, typically in the range of 2 to 6 Hz, are passed directly through the clutch to the vehicle drivetrain, producing pulsations therein when not properly damped. Other torsionals, typically those above about 20 Hz, are absorbed in a torsional damper device, which is an element of the torque converter. Thus, the action of completely locking the torque converter clutch is often restricted to specified vehicle operating conditions to minimize the effects on noise, vibration and harshness (NVH). As a result, potential efficiency gains afforded by fully engaging the torque converter clutch are only realized over a portion of the range of vehicle operation.

To overcome the disadvantages of torque converter clutch engagement, it has been proposed to operate the clutch in a slipping mode wherein a predetermined amount of slippage between the torque converter impeller and turbine is permitted for regulating the torque capacity of the clutch. In any such system, the objective is to isolate engine torque perturbations in the torque converter while passing steady state engine torque at a slip rate that provides improved torque converter efficiency, leading to improved fuel economy.

SUMMARY

A method for controlling actuation of a torque converter clutch includes monitoring a transmission input speed, comparing the monitored transmission input speed to a threshold input speed, and, when the transmission input speed is less than the threshold input speed, controlling an engine speed based upon a desired minimum engine speed. Controlling the engine speed based upon the desired minimum engine speed includes monitoring a minimum engine speed critical parameter, determining the desired minimum engine speed based upon the minimum engine speed critical parameter, comparing the engine speed to the desired minimum engine speed, and controlling actuation of the clutch device based upon a result of the comparing the engine speed to the desired minimum engine speed.

BRIEF DESCRIPTION OF THE DRAWINGS

One or more embodiments will now be described, by way of example, with reference to the accompanying drawings, in which.

DETAILED DESCRIPTION

Figure 1:
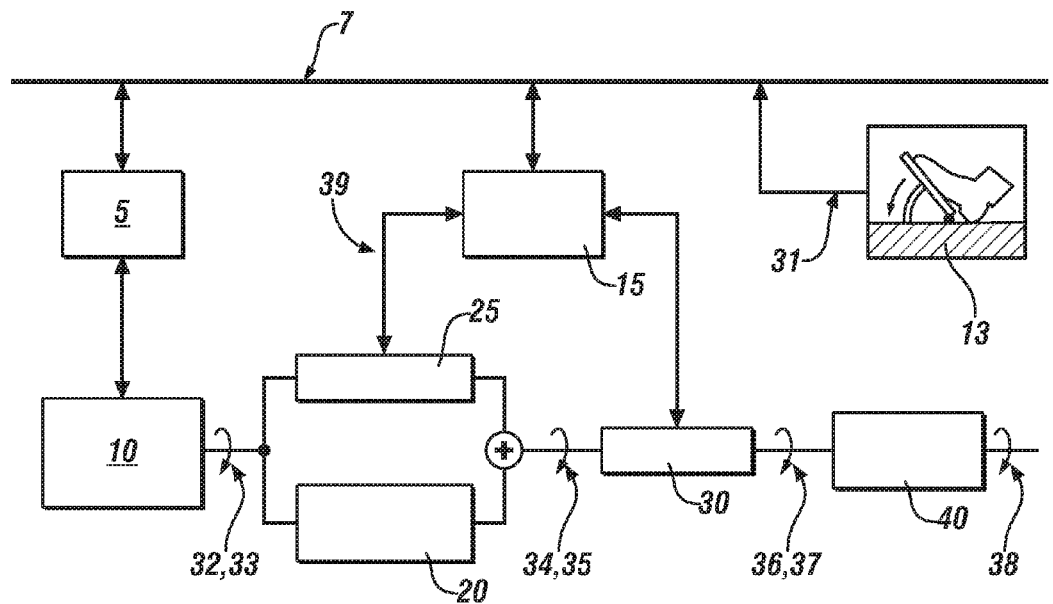
FIG. 1 illustrates an exemplary engine, transmission, driveline, and control system, in accordance with the present disclosure.

Referring now to the drawings, wherein the showings are for the purpose of illustrating certain exemplary embodiments only and not for the purpose of limiting the same, FIG. 1 illustrates an exemplary engine 10, transmission 30, driveline 40, and control system. Engine 10 preferably includes any one of various multi-cylinder internal combustion engine configurations controlled by an engine control module (ECM) 5 based upon a torque request $T_{O\_REQ}$ input, signal 31, from a user interface 13 which provides one or more operator inputs, e.g. from a throttle pedal device and a brake pedal device. A rotatable output shaft of the engine is connected to an input shaft of a fluidic torque converter 20 which is preferably disposed within a housing of transmission 30.

The torque converter 20 includes a torque converter clutch (TCC) 25, which transmits torque input from the input shaft from the engine, when engaged. Engine power output, including engine rotational speed, $N_E$ or signal 32, measured in revolutions per minute (rpm) and engine torque, $T_E$ or signal 33, measured in Newton-meters (N-m), can be transmitted across either or both the torque converter 20 and the TCC 25 to the input shaft of the transmission 30. The input shaft to torque converter 20 is connected to an impeller or input member of the torque converter 20. A turbine or output member of the torque converter 20 is rotatably driven by the impeller by means of fluid transfer therebetween, and connects to and rotatably drives a shaft input to the transmission 30, which has inputs of transmission input speed, $N_I$ or signal 34, and torque, $T_I$ or signal 35. The torque converter clutch (TCC) assembly 25 preferably includes a hydraulically-actuated clutch device that is selectively controlled to engage the impeller and the turbine. The TCC is preferably controlled by a transmission control module (TCM) 15 operative to generate a pulse-width-modulated (PWM) signal, signal 39, having a variable duty cycle effective to control hydraulic pressure.

The TCC 25 can be fully released, actuated in a slip mode, and fully engaged, i.e. locked. When the TCC is fully released, there is unrestrained slippage between the impeller and the turbine, and torque is transmitted therebetween based upon the flow of hydraulic fluid between the impeller and the turbine. When the TCC is actuated in a slip mode, the TCC 25 is actuated but there is slippage between the impeller and the turbine, with a resulting difference in rotational speeds between the impeller and the turbine. Torque is transmitted between the impeller and the turbine through the flow of hydraulic fluid and through the actuated TCC 25, with slippage in the system which absorbs engine and driveline perturbations. When the TCC 25 is locked, the rotational speeds of the impeller and the turbine are the same, and torque is transmitted between the impeller and the turbine through the actuated clutch. The TCC 25 is controlled by a PWM signal from the TCM 15, such that when the PWM duty cycle is relatively low, the clutch pressure is low, and the torque converter functions as a normally fluidic pump device, as previously disclosed. When the PWM duty cycle is increased, hydraulic pressure increases, increasing clutch pressure and mechanically engaging the impeller and the turbine devices, with a level of slippage therebetween ($N_E$-$N_I$) based upon the clutch pressure, engine torque and speed, and other operating conditions.

The output from the torque converter 20, torque $T_I$ and rotational speed $N_I$, transmitted through the turbine/impeller and the TCC 25, is input through a shaft to the transmission 30. The transmission 30 includes a gear set suitable for providing a plurality of fixed gear ratios between the torque converter output shaft and an output shaft of the transmission. The transmission 30 preferably includes a hydraulic pump and circuit operative to supply pressurized hydraulic fluid to various devices in the transmission to effect operation of the transmission and the torque converter. The output shaft of the transmission is characterized by an output speed, $N_O$ or signal 36, and output torque, $T_O$ or signal 37, and is operatively connected to driveline 40 for delivering tractive torque to one or more vehicle wheels, characterized by vehicle speed, $V_{SS}$ or signal 38.

The system includes sensing devices operative to sense operator demands, and operating conditions of the engine and transmission devices. Operator demands, illustrated as the torque request $T_{O\_REQ}$ input from the user interface 13 in FIG. 1, typically include demands for torque in the form of acceleration and braking using inputs from an accelerator pedal and a brake pedal. Engine operating conditions are determined using sensing devices that are installed on the engine to monitor physical characteristics and generate signals which are correlatable to engine and ambient parameters, specifically an engine operating point. The engine operating point includes a measure of engine crankshaft speed output to the transmission ($N_E$) and load (MAP), measurable using, e.g., an intake manifold pressure sensor or a mass air flow sensor. Each of the sensing devices is signally connected to the ECM 5 to provide signal information which is transformed by the ECM to information representative of the respective monitored parameter. It is understood that this configuration is illustrative, not restrictive, including the various sensing devices being replaceable within functional equivalent devices and algorithms and still fall within the scope of the disclosure. The transmission 30 includes an output speed sensor, typically a variable reluctance transducer, operative to monitor rotational speed, $N_O$, of the output shaft, from which input speed, $N_I$, of the transmission is determined based upon the specific gear ratio (GR) at which the transmission 30 is operating. Alternatively, a sensor can be mechanized in a system to directly monitor transmission input speed, $N_I$.

The control system for operation of the methods disclosed includes elements of an overall vehicle control system, preferably executed in a distributed control module architecture to provide coordinated system control. The ECM 5, TCM 15 and the user interface 13 are each signally connected via a local area network (LAN) 6, which is operative to provide structured signal communication between the various control modules. The ECM and the TCM are each operable to synthesize pertinent information and receive inputs from the aforementioned sensing devices, and execute algorithms to control various actuators to achieve control targets, including for such parameters as fuel economy, emissions, performance, driveability, and for protection of hardware.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the disclosed functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
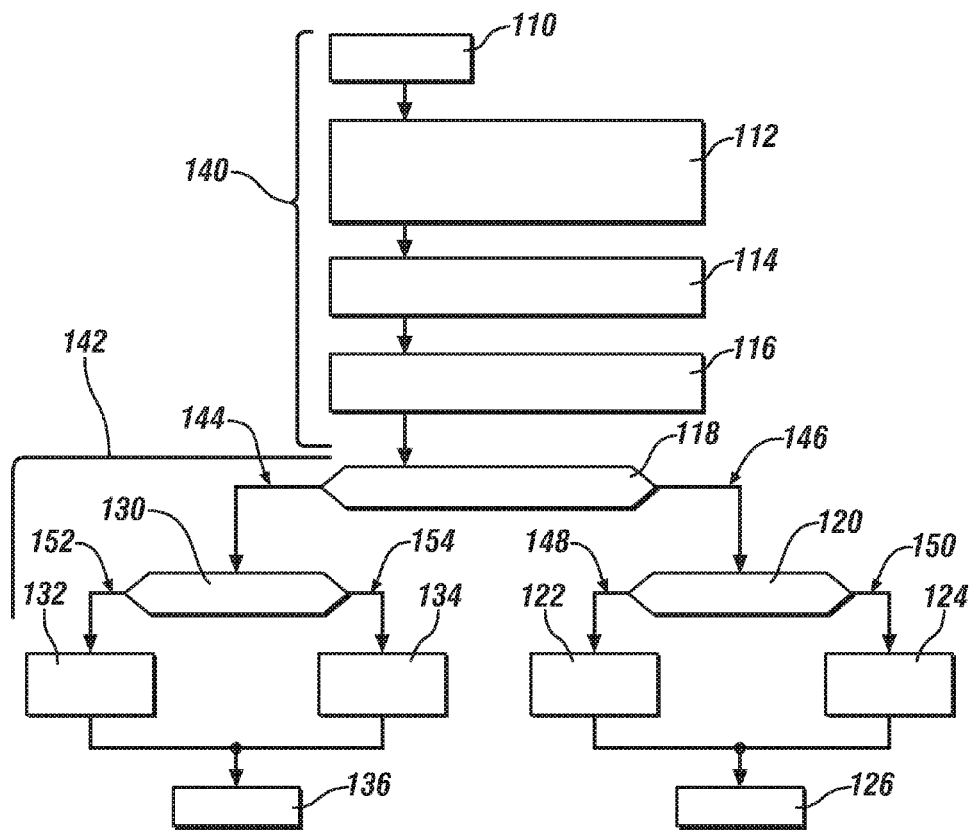
FIG. 2 illustrates an exemplary process to control a torque converter clutch based upon a monitored transmission input speed, in accordance with the present disclosure.

Methods disclosed herein are executed primarily in the TCM 15, effective to control actuation and operation of the TCC 25 during ongoing vehicle operation. FIG. 2 illustrates an exemplary process to control a TCC based upon a monitored transmission input speed. The method includes determining the engine operating point, engine speed, i.e., transmission input speed, and, an operator demand for torque. The TCC is engaged and actuated to a control level, based upon the operator demand for torque and the engine operating point. Actuation can include a feed-forward control method. When the transmission input speed is less than a threshold, actuation of the clutch device can be controlled in a manner effective to maintain the engine speed greater than a minimum speed level. When the transmission input speed is greater than the aforementioned threshold, actuation of the clutch device can be controlled effective to maintain slippage across the torque converter substantially at a preset slippage level.

Referring again to FIG. 2, Table 1 is provided as a key wherein the numerically labeled blocks and the corresponding functions are set forth as follows.

TABLE 1

| BLOCK | DESCRIPTION |
|---|---|
| 110 | Slip Mode |
| 112 | Monitor: Engine ($N_E$, $T_E$); Transmission ($N_O$, $N_I$, GR, PR_HYD); Operator Inputs ($T_{O\ REQ}$, BRAKE) |
| 114 | Determine Slip |
| 116 | Actuate TCC |

TABLE 1-continued

| BLOCK | DESCRIPTION |
|---|---|
| 118 | Determine If $N_I$ Is Greater Than a Threshold |
| 120 | Determine Difference between Slip and Desired Slip |
| 122 | Increase TCC_PWM |
| 124 | Decrease TCC_PWM |
| 126 | Continue |
| 130 | Determine Difference between Engine Speed and Minimum Engine Speed |
| 132 | Increase TCC_PWM |
| 134 | Decrease TCC_PWM |
| 136 | Continue |

The exemplary process starts as the TCM commands operation in TCC slip mode (Block 110) to engage the TCC 25, typically based upon operating conditions in the engine, transmission and driveline. Operating conditions are monitored (Block 112), typically including engine speed $N_E$, and torque $T_E$, transmission input speed, $N_I$, output speed $N_O$, gear ratio GR, and hydraulic pressure PR_HYD, and operator inputs including operator torque request $T_{O\_REQ}$. Slip across the TCC is determined, based upon a difference between the engine speed $N_E$, and the transmission input speed $N_I$ (Block 114). The TCC is actuated by controlling flow of pressurized hydraulic fluid to engage the TCC to the torque converter using a feed-forward control scheme. The feed-forward control scheme engages the TCC by determining a TCC command. The TCC command is in the form of a PWM control signal, TCC_PWM, based upon the requested torque $T_{O\_REQ}$ and engine torque $T_E$, which is determined from the engine operating point disclosed above (Block 116). The feed-forward control scheme preferably includes a known control scheme which uses proportional and integral elements in an iterative operation to achieve the determined PWM control signal, TCC_PWM and engage the TCC. Blocks 110 through 116 are collectively labeled by bracket 140 as corresponding to an engagement operation or ENGAGE mode.

When the TCC is engaged by actuation thereof, the control mode switches to an APPLY mode indicated by bracket 142, wherein the TCC command TCC_PWM is determined based upon the feed-forward control, adjusted using a feedback control scheme. In the APPLY mode, the type of feedback control is determined based upon transmission input speed $N_I$ (Block 118). When the transmission input speed is above a threshold (typically a range of 900 to 1100 rpm), the PWM control signal, TCC_PWM is adjusted based upon magnitude of slippage across the torque converter, determined as shown in block 114, following selection 146 to block 120. When the transmission input speed is below the threshold, the PWM control signal TCC_PWM is controlled based upon magnitude of engine speed $N_E$, following selection 144 to block 130.

When the transmission input speed is below the threshold, actuation of the torque converter clutch is controlled effective to maintain the engine speed greater than a minimum speed level, within an allowable range or deadband (DB). TCC actuation includes transmission of torque between the engine and the transmission. Under normal operation wherein the engine is applying a torque to the transmission to provide propelling force to a transmission output shaft, an increase in the duty cycle of the TCC increases a slowing torque applied to the engine. A decrease in the duty cycle of the TCC decreases the slowing torque applied to the engine. When the engine speed is close to the minimum engine speed, controlling the TCC based upon the engine speed can avoid violating the minimum engine speed. The engine speed $N_E$ is compared to a minimum engine speed, $N_{E\_MIN}$ (Block 130). When the engine speed $N_E$ is greater than the minimum engine speed, $N_{E\_MIN}$, by an amount greater than the deadband, following selection 152, the duty cycle of the PWM control signal TCC_PWM is increased (Block 132) by a fixed amount, e.g. 1%, or by an amount that is determined based upon the difference between the engine speed $N_E$ and the minimum engine speed, $N_{E\_MIN}$. When the engine speed $N_E$ is less than the minimum engine speed, $N_{E\_MIN}$, by an amount greater than the deadband, following selection 154, the duty cycle of the PWM control signal TCC_PWM is decreased (Block 134) by a fixed amount, e.g. 1%, or by an amount that is determined based upon the difference between the engine speed $N_E$ and the minimum engine speed, $N_{E\_MIN}$.

The engine speed control scheme controls application of the torque converter clutch to maintain engine speed within an allowable range of the minimum engine speed. The minimum engine speed can be a calibrated value, for example, based upon a value selected to maintain proper operation of the engine and related devices, or the minimum engine speed can be determined on-board the vehicle as a desired minimum engine speed. A number of factors can affect selection of a desired minimum engine speed. The engine can supply power to the hydraulic pump that provides pressurized fluid to a number of vehicle systems and devices including the TCC. A desired minimum engine speed can be selected based upon a minimum speed required to power a hydraulic pump and protect proper operation of the systems and devices using pressurized hydraulic fluid. In order to determine the minimum engine speed required to power the hydraulic pump, requirements for hydraulic pressure can be monitored, and the minimum engine speed required to power the hydraulic pump can be determined based upon the monitored requirements.

Another factor that can be used to determine a desired minimum engine speed is NVH. One having ordinary skill in the art will appreciate that NVH characteristics of an engine and the associated powertrain change significantly with engine speed. These NVH characteristics can also vary by engine torque and transmission gear. Changes in the physical configuration of the powertrain in different gear states create different harmonics or otherwise change the NVH behavior of the powertrain from gear state to gear state. As a result, driveline dynamics can be studied in each gear state to predict NVH behavior of the transmission and determine a minimum engine speed based upon NVH in the different gear states. These characteristics can be calibrated through any means sufficient to evaluate NVH in the powertrain and stored for reference in a look-up table for use in determining a minimum engine speed based upon the tabulated NVH characteristics or a minimum engine speed based upon NVH. In one embodiment, a look-up table can be referenced based upon transmission gear state, and a minimum engine speed based upon NVH can be determined from the look-up table. In the alternative, a sensor describing NVH characteristics can be monitored, and the minimum engine speed based upon NVH can be determined based upon these monitored NVH characteristics. For example, an accelerometer can be used to monitor vibration at a known harmonic frequency of the engine that tends to resonate when the engine speed is too low.

A desired minimum engine speed can be controlled through a time span according to a minimum engine speed dynamic profile or through a series of calibrated values based upon occurrence of a monitored condition. For example, after a tip-in event wherein the $T_{O\_REQ}$ is rapidly increased and corresponding $T_E$ is rapidly increased, control of the TCC frequently is relaxed to permit a rapid increase of engine speed. At initiation of a process to reestablish control of the TCC, the minimum engine speed dynamic profile can be determined to start at an initially elevated level and then transition to normal levels. In one embodiment, the minimum engine speed dynamic profile can include a first or starting value at the current engine speed at the time the initiation of this process.

Operation of a hydraulic pump, NVH, and dynamic profiles in response to a monitored condition are exemplary factors that can be used to determine a desired minimum engine speed in an on-board control module. A number of factors are envisioned, and the disclosure is not intended to be limited to the particular exemplary embodiments provided herein. Any one of these factors can be monitored as a minimum engine speed critical parameter. For example, in a particular engine configuration, it can be determined that the hydraulic pump consistently requires a higher minimum engine speed than is required due to NVH concerns. In such a configuration, the requirements of the hydraulic pump can be monitored as the sole or primary minimum engine speed critical parameter. In the alternative, a number of the factors disclosed herein can be monitored, and control according to the factor requiring the highest desired minimum engine speed as the minimum engine speed critical parameter can be selected. Alternatively or additionally, operation of the engine and the associated powertrain can be monitored, and a minimum engine speed critical parameter can be selected based upon the monitored operation and known minimum engine speed requirements in different regions of operation. A number of methods to use a minimum engine speed critical parameter to determine a desired minimum engine speed are envisioned, and the disclosure is not intended to be limited to the particular exemplary embodiments provided herein.

Figure 3:
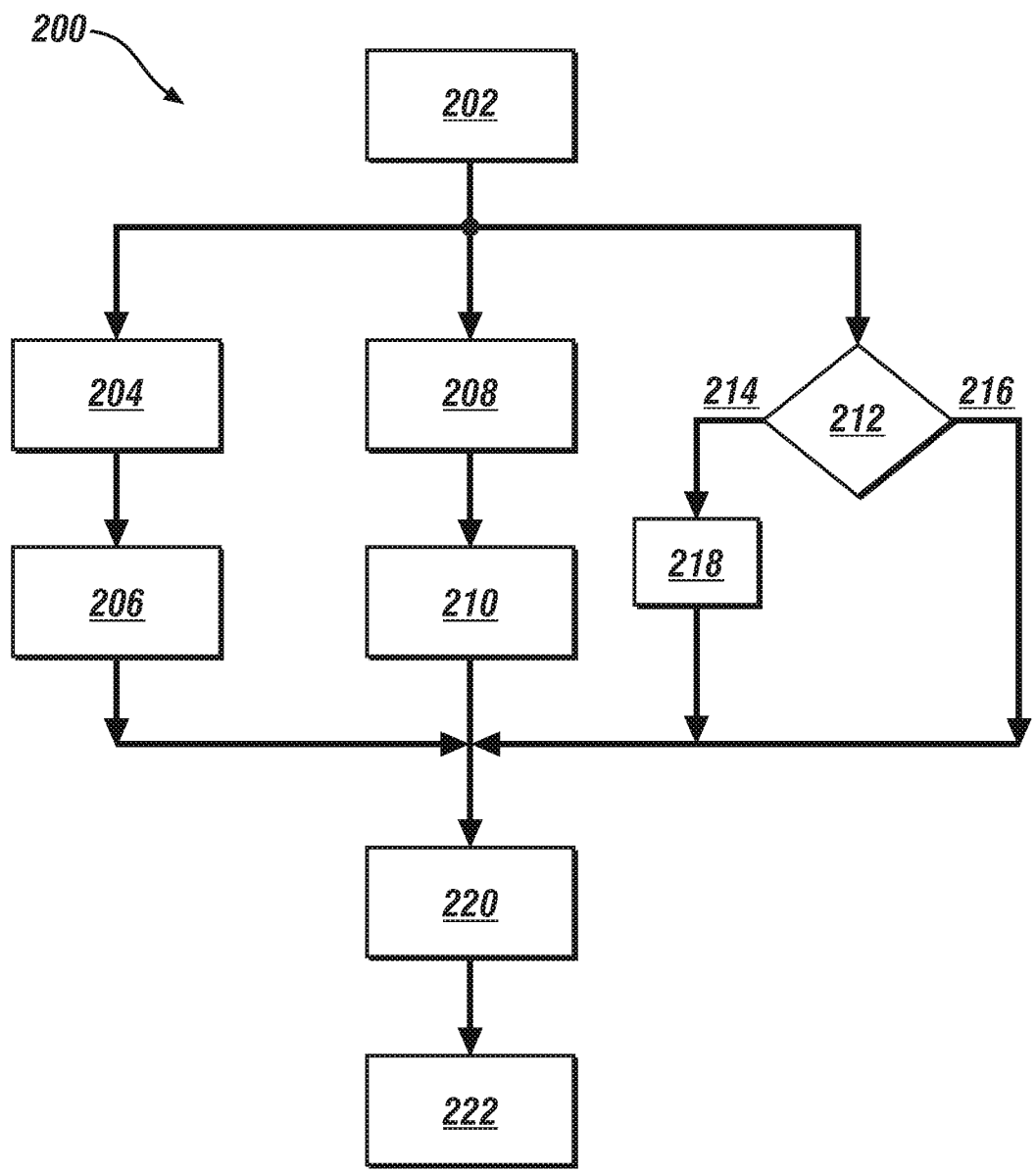
FIG. 3 illustrates an exemplary process to determine a desired minimum engine speed based upon a minimum engine speed critical parameter, in accordance with the present disclosure.

FIG. 3 illustrates an exemplary process to determine a desired minimum engine speed based upon a minimum engine speed critical parameter. Table 2 is provided as a key wherein the numerically labeled blocks and the corresponding functions are set forth as follows.

TABLE 2

| BLOCK | DESCRIPTION |
|---|---|
| 202 | Begin |
| 204 | Monitor a First Factor Affecting Minimum Engine Speed |
| 206 | Determine a First Potential Minimum Engine Speed Based upon the First Factor |
| 208 | Monitor a Second Factor Affecting Minimum Engine Speed |
| 210 | Determine a Second Potential Minimum Engine Speed Based upon the Second Factor |
| 212 | Does a Condition Exist to Set Desired Minimum Engine Speed According to a Dynamic Profile? |
| 214 | Yes |
| 216 | No |
| 218 | Determine a Third Potential Minimum Engine Speed Based upon the Dynamic Profile |
| 220 | Determine a Desired Minimum Engine Speed Based upon the Highest Value of the First, Second, and Third Potential Minimum Engine Speeds |
| 222 | Control Based upon Desired Minimum Engine Speed |

Process 200 begins at Block 202. A first factor affecting a minimum engine speed is monitored (Block 204), and a first potential minimum engine speed based upon the first factor is determined (Block 206). A second factor affecting a minimum engine speed is monitored (Block 208), and a second potential minimum engine speed based upon the second factor is determined (Block 210). A determination is made whether a condition exists to set the desired minimum engine speed according to a dynamic profile (Block 212). If the result of Block 212 is yes (Arrow 214), then a third potential minimum engine speed is determined (Block 218). If the result of Block 212 is no (Arrow 216), then no third potential minimum engine speed is determined. A desired minimum engine speed is determined based upon the first, second, and third potential minimum engine speeds (Block 220). In one embodiment, available potential minimum engine speeds are compared, and a highest value of the potential minimum engine speeds is selected as the desired minimum engine speed. The desired minimum engine speed is utilized by the system (Block 222).

Returning to FIG. 2, when the transmission input speed is above the threshold (Block 118), actuation of the TCC is controlled effective to maintain slippage across the torque converter substantially at a desired slippage level, typically measured as in a difference in rpm ($\Delta$RPM). This includes comparing the determined slip across the TCC to a desired slip, SLIP_DES. (Block 120). A deadband slip, DB, comprising a predetermined hysteresis value of slip (measured in $\Delta$RPM), is included to allow for errors and delays related to mechanical, hydraulic, electrical, and measurement systems operations. When a difference between the determined slip and the desired slip is greater than the deadband slip, the system determines that the slip is greater than desired, and, following selection 148, the duty cycle of the PWM control signal TCC_PWM is increased (Block 122) by a fixed amount, e.g. 1%, or by another suitable amount. When the determined slip is less than the desired slip by an amount greater than the deadband slip, the system determines that the slip is less than desired, and following selection 150, the duty cycle of the PWM control signal TCC_PWM is decreased (Block 124) by a fixed amount, e.g. 1%, or by another suitable amount. In this application, a preferred level of slippage is in the range of about 40 to 50 RPM, with a deadband of about 5 RPM. The level of slippage includes an optimal value, wherein too much slippage can result in loss of engine torque through the torque converter, and too little slippage can result in transmission of unwanted engine or driveline perturbations and resonances to the vehicle chassis and the operator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling actuation of a clutch device for a torque converter operative to transmit torque between an engine and a transmission, comprising:
monitoring a transmission input speed;
comparing the monitored transmission input speed to a threshold input speed; and
when the transmission input speed is less than the threshold input speed, controlling an engine speed based upon a desired minimum engine speed comprising:
monitoring a plurality of minimum engine speed critical parameters, comprising:
a first minimum engine speed critical parameter corresponding to a first minimum engine speed,
a second minimum engine speed critical parameter corresponding to a second minimum engine speed, and
a third minimum engine speed critical parameter corresponding to a third minimum engine speed;

determining the desired minimum engine speed as the greater one of the first, second, and third minimum engine speeds;
comparing the engine speed to the desired minimum engine speed; and
controlling actuation of the clutch device based upon a result of the comparing the engine speed to the desired minimum engine speed.

2. The method of claim 1, further comprising:
when the transmission input speed is not less than the threshold input speed, controlling a torque converter slip based upon the comparing the torque converter slip to a desired slip.

3. The method of claim 1, wherein controlling actuation of the clutch device comprises decreasing actuation pressure of the clutch device when the engine speed is less than the desired minimum engine speed.

4. The method of claim 1, wherein monitoring the first minimum engine speed critical parameter comprises:
monitoring the first minimum engine speed required to power a hydraulic pump.

5. The method of claim 1, wherein monitoring the second minimum engine speed critical parameter comprises:
monitoring noise, vibration and harshness; and
determining the second minimum engine speed based upon said noise, vibration and harshness.

6. The method of claim 1, wherein monitoring the third minimum engine speed critical parameter comprises:
monitoring initiation of a process to reestablish control of the clutch device after a tip-in event, the process utilizing a minimum engine speed dynamic profile; and
determining the minimum engine speed dynamic profile based upon the monitored initiation of the process to reestablish control of the clutch device after a tip-in event.

7. The method of claim 1, wherein monitoring the first, second, and third minimum engine speed critical parameters comprises:
monitoring the first minimum engine speed required to power a hydraulic pump;
monitoring the second minimum engine speed based upon noise, vibration and harshness; and
monitoring the third minimum engine speed based on an initiation of a process to reestablish control of the clutch device after a tip-in event.

8. The method of claim 1, wherein the threshold input speed is selected based upon a predetermined speed range.

9. The method of claim 3, wherein controlling actuation of the clutch device further comprises increasing actuation pressure of the clutch device when the engine speed is not less than the desired minimum engine speed.

10. The method of claim 4, wherein monitoring the first minimum engine speed required to power the hydraulic pump comprises:
monitoring requirements for hydraulic pressure; and
determining the first minimum engine speed based upon the monitored requirements for hydraulic pressure.

11. The method of claim 5, further comprising:
monitoring a transmission gear state; and
wherein determining the second minimum engine speed is further based upon the transmission gear state.

12. The method of claim 6, wherein
determining the minimum engine speed dynamic profile comprises setting an initial value of the minimum engine speed dynamic profile at a current engine speed.

13. The method of claim 7, wherein the third minimum engine speed based on the monitored initiation of the process to reestablish control of the clutch device after a tip-in event comprises:
monitoring occurrence of a condition to utilize a minimum engine speed dynamic profile;
determining a minimum engine speed dynamic profile based upon the monitored initiation of the process to reestablish control of the clutch device after a tip-in event; and
setting the third minimum engine speed according to the minimum engine speed dynamic profile.

14. Apparatus for controlling actuation of a clutch device for a torque converter operative to transmit torque between an engine and a transmission, the apparatus comprising:
the clutch device;
a control module:
monitoring a transmission input speed;
comparing the monitored transmission input speed to a threshold input speed; and
when the transmission input speed is less than the threshold input speed, controlling an engine speed based upon a desired minimum engine speed comprising:
monitoring a plurality of minimum engine speed critical parameter, comprises:
a first minimum engine speed critical parameter corresponding to a first minimum engine speed,
a second minimum engine speed critical parameter corresponding to a second minimum engine speed, and
a third minimum engine speed critical parameter corresponding to a third minimum engine speed;
determining the desired minimum engine speed as a highest one of the first, second, and third minimum engine speeds;
comparing the engine speed to the desired minimum engine speed; and
controlling actuation of the clutch device based upon a result of the comparing the engine speed to the desired minimum engine speed.

* * * * *